United States Patent
Xie et al.

(10) Patent No.: US 11,561,657 B2
(45) Date of Patent: Jan. 24, 2023

(54) TOUCH PANEL AND MANUFACTURING METHOD THEREFOR, AND TOUCH DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Taofeng Xie, Beijing (CN); Xiaoyue He, Beijing (CN)

(73) Assignees: Hefei Xinsheng Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 503 days.

(21) Appl. No.: 16/338,744

(22) PCT Filed: Sep. 6, 2018

(86) PCT No.: PCT/CN2018/104300
§ 371 (c)(1),
(2) Date: Apr. 2, 2019

(87) PCT Pub. No.: WO2019/052391
PCT Pub. Date: Mar. 21, 2019

(65) Prior Publication Data
US 2021/0286468 A1    Sep. 16, 2021

(30) Foreign Application Priority Data
Sep. 15, 2017    (CN) .......................... 201710831597.8

(51) Int. Cl.
*G06F 3/044*    (2006.01)

(52) U.S. Cl.
CPC .......... *G06F 3/0445* (2019.05); *G06F 3/0446* (2019.05); *G06F 2203/04103* (2013.01); *G06F 2203/04112* (2013.01)

(58) Field of Classification Search
CPC ................. G06F 3/0445; G06F 3/0446; G06F 2203/04103; G06F 2203/04112
See application file for complete search history.

(56) References Cited

U.S. PATENT DOCUMENTS 9,459,747 B2    10/2016    Donnelly et al.
10,338,706 B2    7/2019    Lim et al.
(Continued)

FOREIGN PATENT DOCUMENTS

CN    103870075 A    6/2014
CN    203720816 U    7/2014
(Continued)

OTHER PUBLICATIONS

Dec. 10, 2018—(WO) International Search Report and Written Opinion Appn PCT/CN2018/104300 with English Translation.
(Continued)

*Primary Examiner* — Mark W Regn
(74) *Attorney, Agent, or Firm* — Banner & Witcoff, Ltd.

(57) ABSTRACT

A touch panel and a manufacturing method thereof and a touch display device are disclosed. The touch panel includes: a base substrate; and a first touch electrode on the base substrate, the first touch electrode including a plurality of first touch electrode lines intersecting with one another, wherein in a direction perpendicular to the base substrate, each of the first touch electrode lines include at least two laminated transparent conductive layers, which include a laminate of a first metal oxide layer and a first metal layer, or a laminate of the first metal oxide layer and a first graphene layer.

15 Claims, 2 Drawing Sheets

(56) References Cited

U.S. PATENT DOCUMENTS

| | | | |
|---|---|---|---|
| 2011/0285640 A1* | 11/2011 | Park | G02F 1/13338 |
| | | | 345/173 |
| 2014/0160373 A1 | 6/2014 | Hsu et al. | |
| 2015/0160758 A1* | 6/2015 | Chen | G06F 3/0445 |
| | | | 345/174 |
| 2016/0041644 A1* | 2/2016 | Bae | G06F 3/0443 |
| | | | 345/174 |
| 2016/0077628 A1* | 3/2016 | Liu | G06F 3/0446 |
| | | | 345/174 |
| 2016/0202613 A1* | 7/2016 | Di | G06F 3/041 |
| | | | 345/173 |
| 2017/0060309 A1* | 3/2017 | Chen | G02F 1/133514 |
| 2017/0192587 A1* | 7/2017 | Zhang | G06F 3/0443 |
| 2017/0285780 A1* | 10/2017 | Park | G06F 3/0443 |
| 2018/0321763 A1 | 11/2018 | Liu et al. | |

FOREIGN PATENT DOCUMENTS

| | | | |
|---|---|---|---|
| CN | 203746035 U | | 7/2014 |
| CN | 203812218 U | * | 9/2014 |
| CN | 105009042 A | | 10/2015 |
| CN | 106293200 A | | 1/2017 |
| CN | 107003777 A | | 8/2017 |
| CN | 107512050 A | | 12/2017 |
| JP | 2000123658 A | | 4/2000 |
| JP | 2008235098 A | | 10/2008 |

OTHER PUBLICATIONS

Dec. 11, 2018—(CN) First Office Action Appn 201710831597.8 with English Translation.

* cited by examiner

TOUCH PANEL AND MANUFACTURING METHOD THEREFOR, AND TOUCH DISPLAY DEVICE

The application is a U.S. National Phase Entry of International Application No. PCT/CN2018/104300 filed on Sep. 6, 2018, designating the United States of America and claiming priority to Chinese Patent Application No. 201710831597.8 filed on Sep. 15, 2017. The present application claims priority to and the benefit of the above-identified applications and the above-identified applications are incorporated by reference herein in their entirety.

TECHNICAL FIELD

At least one embodiment of the present disclosure relates to a touch panel and a manufacturing method thereof and a touch display device.

BACKGROUND

A metal mesh is a metal mesh pattern made of an oxide or a metal material such as silver or copper on a glass/polyethylene glycol terephthalate (glass/PET) thin film. The metal mesh has a theoretical minimum surface resistance of 0.1 ohm/□, and reduces signal interference due to an electromagnetic shielding function, but a touch sensor fabricated with the metal mesh has a very obvious Moire interference fringe due to a relatively thick line width (the line width exceeding 5 μm) of the pattern, and thus is only suitable for display screens having a large viewing distance.

SUMMARY

At least one embodiment of the present disclosure provides a touch panel, a manufacturing method of the touch panel and a touch display device. The touch panel includes: a base substrate; and a first touch electrode on the base substrate, wherein the first touch electrode includes a plurality of first touch electrode lines intersecting with one another, wherein in a direction perpendicular to the base substrate, each of the plurality of first touch electrode lines include at least two laminated transparent conductive layers, and the at least two laminated transparent conductive layers include a laminate of a first metal oxide layer and a first metal layer, or a laminate of the first metal oxide layer and a first graphene layer.

For example, each of the plurality of first touch electrode lines further includes a second metal oxide layer on a side of the first metal layer away from the first metal oxide layer or on a side of the first graphene layer away from the first metal oxide layer.

For example, a material of the first metal layer includes a silver palladium copper alloy.

For example, in the direction perpendicular to the base substrate, the first metal layer has a thickness ranging from 150 Å to 250 Å.

For example, in the direction perpendicular to the base substrate, each of the plurality of first touch electrode lines has a thickness ranging from 750 Å to 2650 Å.

For example, each of the plurality of first touch electrode lines has a square resistance which is not greater than 10Ω/□.

For example, a material of at least one of the first metal oxide layer and the second metal oxide layer includes indium tin oxide.

For example, the touch panel further includes: a second touch electrode on a side of the first touch electrode away from the base substrate, wherein the second touch electrode includes a plurality of second touch electrode lines intersecting with one another, and the first touch electrode is insulated from the second touch electrode, wherein the plurality of second touch electrode lines includes at least two another laminated transparent conductive layers, and the at least two another laminated transparent conductive layers include a laminate of a third metal oxide layer and a second metal layer, or a laminate of the third metal oxide layer and a second graphene layer.

For example, the touch panel further includes: a shadow eliminating layer between the first touch electrode and the base substrate, or on a side of the first touch electrode away from the base substrate.

At least one embodiment of the present disclosure further provides a manufacturing method of a touch panel, and the method includes: forming a first touch electrode layer on a base substrate, wherein the forming the first touch electrode layer includes forming at least two laminated transparent conductive layers, and the forming the at least two laminated transparent conductive layers includes sequentially forming a first metal oxide layer and a first metal layer, or sequentially forming the first metal oxide layer and a first graphene layer; and patterning the first touch electrode layer to form a first touch electrode, wherein the first touch electrode includes a plurality of first touch electrode lines intersecting with one another.

For example, the forming the at least two laminated transparent conductive layers further includes: forming a second metal oxide layer on a side of the first metal layer away from the first metal oxide layer or on a side of the first graphene layer away from the first metal oxide layer.

For example, the patterning the first touch electrode layer includes: patterning the at least two laminated transparent conductive layers by using a single patterning process.

For example, the manufacturing method further includes: forming a second touch electrode layer on a side of the first touch electrode away from the base substrate, wherein the forming the second touch electrode layer includes forming at least two another laminated transparent conductive layers, the forming the at least two another laminated transparent conductive layers includes sequentially forming a third metal oxide layer and a second metal layer, or sequentially forming the third metal oxide layer and a second graphene layer; and the second touch electrode layer is insulated from the first touch electrode; and patterning the second touch electrode layer to form a second touch electrode, wherein the second touch electrode includes a plurality of second touch electrode lines intersecting with one another.

For example, the manufacturing method further includes: forming a shadow eliminating layer on the base substrate before the first touch electrode layer is formed on the base substrate, or forming the shadow eliminating layer on a side of the first touch electrode away from the base substrate after the first touch electrode is formed.

At least one embodiment of the present disclosure further provides a touch display device, which includes the touch panel provided by any one of the above embodiments.

BRIEF DESCRIPTION OF THE DRAWINGS

In order to clearly illustrate the technical solution of the embodiments of the present disclosure, the drawings of the embodiments will be briefly described in the following; it is obvious that the described drawings are only related to some

DETAILED DESCRIPTION

In order to make objects, technical solutions and advantages of the embodiments of the present disclosure apparent, the technical solutions of the embodiment of the present disclosure will be described in a clearly and fully understandable way in connection with the drawings related to the embodiments of the present disclosure. It is obvious that the described embodiments are just a part but not all of the embodiments of the present disclosure. Based on the described embodiments herein, those skilled in the art can obtain other embodiment(s), without any inventive work, which should be within the scope of the present disclosure.

Unless otherwise specified, the technical terms or scientific terms here should be of general meaning as understood by those ordinarily skilled in the art. In the present disclosure, words such as "first", "second" and the like do not denote any order, quantity, or importance, but rather are used for distinguishing different components. Words such as "include" or "comprise" and the like denote that elements or objects appearing before the words of "include" or "comprise" cover the elements or the objects enumerated after the words of "include" or "comprise" or equivalents thereof, not exclusive of other elements or objects. Words such as "up", "down", "left", "right" and the like are only used for expressing relative positional relationship, when the absolute position of the described object is changed, the relative positional relationship may also be correspondingly changed.

Figure 1:
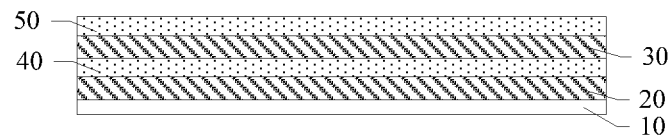
FIG. 1 is a schematic diagram of partial layer structures of a metal mesh touch panel.

FIG. 1 is a schematic diagram of partial layer structures of a metal mesh touch panel. As shown in FIG. 1, a general metal mesh touch panel includes: a base substrate 10; a plurality of first touch electrodes 20, a first insulating layer 40, a plurality of second touch electrodes 30 and a second insulating layer 50 sequentially provided on the base substrate 10. The plurality of first touch electrodes 20 and the plurality of second touch electrodes 30 may form capacitors at intersection positions, and when there is a finger touching, coupling of capacitors near a touch point is affected, so that capacitances of the capacitors near the touch point is changed, and thus, a touch position may be determined according to the change in the capacitances.

The first touch electrodes 20 and the second touch electrodes 30 in the metal mesh touch panel shown in FIG. 1 are electrode structures using a metal such as copper or silver or the like to form the metal mesh; and as compared with a case where indium tin oxide (ITO) serves as a touch electrode material of a touch panel, the metal mesh has a good electrical property and a low square resistance, and may be applied to a large-sized touch display product.

In the study, the inventors of the present application find that: due to specific characteristics of high reflectivity and low transmittance of the metal, a Moire phenomenon is obvious in the touch electrode with the metal mesh used therein, which is hard to overcome from a production process.

The embodiments of the present disclosure provide a touch panel and a manufacturing method thereof, and a touch display device. The touch panel includes: a base substrate; and a first touch electrode located on the base substrate, the first touch electrode including a plurality of first touch electrode lines intersecting with one another. In a direction perpendicular to the base substrate, the first touch electrode lines includes at least two laminated transparent conductive layers, and the at least two laminated transparent conductive layers include a laminate of a first metal oxide layer and a first metal layer, or include a laminate of the first metal oxide layer and a first graphene layer. The touch panel uses the at least two laminated transparent conductive layers to replace the metal mesh and to form mesh touch electrode lines in a touch electrode, which eliminates the Moire, and thus, improves an optical quality of the touch panel.

Hereinafter, the touch panel and the manufacturing method thereof, and the touch display device provided by the embodiments of the present disclosure will be described in conjunction with the accompanying drawings.

Figure 2A:
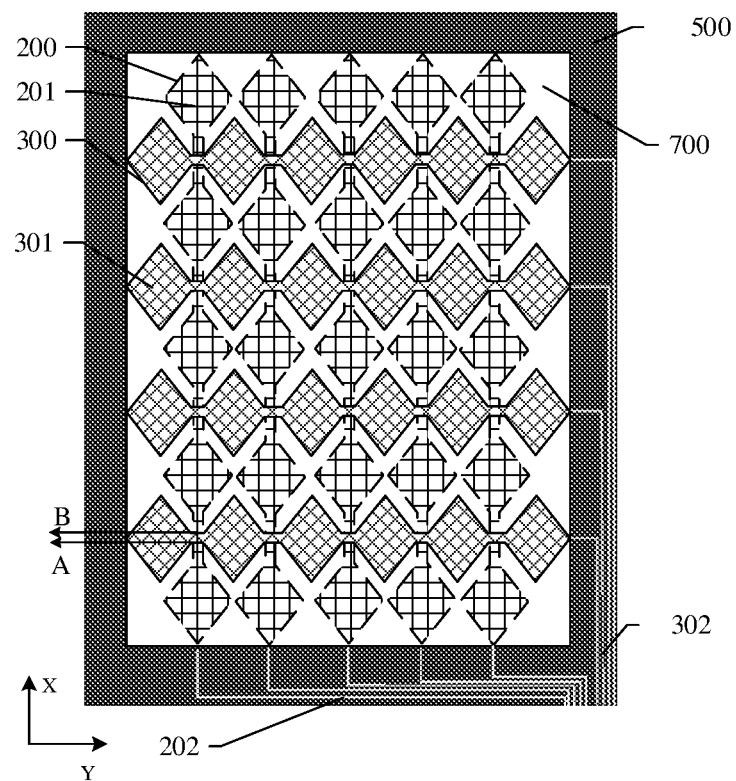
FIG. 2A is a schematic plan view of a touch panel provided by one embodiment of the present disclosure.
Figure 2B:
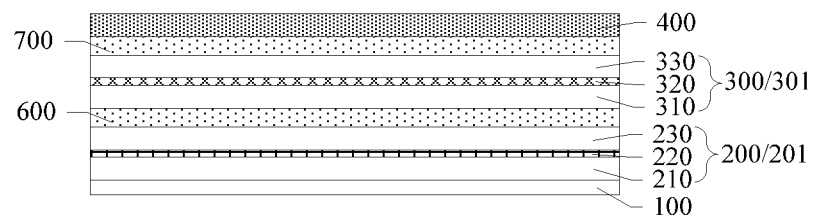
FIG. 2B is a cross-sectional view of partial layer structures taken along line AB in FIG. 2A.

FIG. 2A is a schematic plan view of the touch panel provided by one embodiment of the present disclosure, and FIG. 2B is a cross-sectional view of partial layer structures taken along line AB in FIG. 2A according to one example of this embodiment. As shown in FIG. 2A and FIG. 2B, the touch panel provided by this embodiment includes a base substrate 100 and a plurality of first touch electrodes 200 located on the base substrate 100, and each first touch electrode 200 includes a plurality of first touch electrode lines 201 intersecting with one another; in a direction perpendicular to the base substrate 100, the first touch electrode line 201 includes at least two laminated transparent conductive layers, and the at least two laminated transparent conductive layers include a laminate of a first metal oxide layer 210 and a first metal layer 220 (or a first graphene layer 220).

For example, an example of this embodiment is described with a case where the first metal layer 220 (or the first graphene layer 220) is located on a side of the first metal oxide layer 210 away from the base substrate 100 as an example, which is not limited thereto. For example, it may also be a case where the first metal oxide layer 210 is located on a side of the first metal layer 220 (or the first graphene layer 220) away from the base substrate 100.

For example, as shown in FIG. 2B, the first graphene layer 220 in the first touch electrode line 201 has an optical transmittance above 90% and a relatively low resistivity. Therefore, in the embodiment of the present disclosure, a structure of at least two laminated transparent conductive layers (i.e., the first metal oxide layer and the first graphene layer) is used for replacing the conventional metal mesh and serving as the mesh touch electrode lines in the touch electrode, which not only ensures an electrical demand of the touch panel, but also effectively eliminates the Moire phenomenon.

For example, as shown in FIG. 2B, a material of the first metal layer 220 in the first touch electrode line 201 includes a silver palladium copper alloy (APC), with silver as a main component in the electrical material.

For example, as shown in FIG. 2B, in the direction perpendicular to the base substrate 100, the first metal layer 220 has a thickness ranging from 150 Å (angstrom) to 250 Å. For example, the silver palladium copper alloy has a thickness ranging from 150 Å to 250 Å, in which case, the silver palladium copper alloy has an optical transmittance up to above 70% and has a square resistance lower than 10Ω/□.

In addition, in an example of this embodiment, the first metal layer is provided on a side of the first metal oxide layer away from the base substrate, which may effectively prevent the first metal layer from being broken due to excessive thinness. In the embodiment of the present disclosure, the structure of the at least two laminated transparent conductive layers (i.e., the first metal oxide layer and the first metal layer) is used for replacing the conventional metal mesh and serving as the mesh touch electrode line in the first touch electrode, which not only ensures the electrical demand of the touch panel, but also effectively eliminates the Moire phenomenon.

For example, as shown in FIG. 2B, the first touch electrode line 201 in the touch panel provided by an example of this embodiment further includes a second metal oxide layer 230 located on a side of the first metal layer 220 (or the first graphene layer 220) away from the first metal oxide layer 210.

For example, in the direction perpendicular to the base substrate 100, the first metal layer 220 of the first touch electrode line 201 is provided between the first metal oxide layer 210 and the second metal oxide layer 230. The two metal oxide layers in the first touch electrode line may prevent the first metal layer from being oxidized and corroded, and the tri-laminar transparent conductive layer structure included in the first touch electrode line may effectively eliminate the Moire phenomenon generated in the touch electrode, without affecting the electrical property of the first touch electrode.

For example, a material of at least one of the first metal oxide layer 210 and the second metal oxide layer 230 includes indium tin oxide (ITO). This embodiment is not limited thereto, for example, the material of the two metal oxide layers may include a combination or at least one of indium zinc oxide (IZO), zinc oxide (ZnO), indium oxide ($In_2O_3$), indium gallium oxide (IGO) and aluminum zinc oxide (AZO).

For example, the first touch electrode line 201 has a square resistance which is not greater than 10Ω/□. For example, the first touch electrode line 201 has the square resistance ranging from 4Ω/□ to 7Ω/□, and this embodiment includes, but is not limited thereto.

For example, as shown in FIG. 2B, in the direction perpendicular to the base substrate 100, the first touch electrode line 201 has a thickness ranging from 750 Å to 2650 Å. For example, the first metal oxide layer 210 has a thickness ranging from 300 Å to 1200 Å. For example, the second metal oxide layer 230 has a thickness ranging from 300 Å to 1200 Å. In a case where the first touch electrode line 201 has the thickness ranging from 750 Å to 2650 Å, each first touch electrode line 201 has an optical transmittance which is not smaller than 70% and the square resistance which is not greater than 10Ω/□, and this may effectively eliminate the Moire phenomenon under the premise that the first touch electrode is ensured to have a good electrical property, because the first touch electrode has a relatively high optical transmittance.

For example, as shown in FIG. 2A and FIG. 2B, the touch electrode structure provided by an example of this embodiment further includes a plurality of second touch electrodes 300 located on a side of the first touch electrode 200 away from the base substrate 100, each second touch electrode 300 includes a plurality of second touch electrode lines 301 intersecting with one another, the first touch electrodes 200 are insulated from the second touch electrodes 300, and the second touch electrode line 301 includes at least two laminated transparent conductive layers, that is, the second touch electrode line 301 includes a third metal oxide layer 310 and a second metal layer 320 (or a second graphene layer 320).

For example, as shown in FIG. 2B, the second touch electrode line 301 further includes a fourth metal oxide layer 330 located on a side of the second metal layer 320 (or the second graphene layer 320) away from the third metal oxide layer 310.

For example, this embodiment is described with a case where each of the first touch electrode line 201 and the second touch electrode line 301 include only three transparent conductive layers as an example, which is not limited thereto, or at least one of the two may include two, four, or more transparent conductive layers.

For example, the first touch electrode line 201 and the second touch electrode line 301 according to this embodiment may consist of a same conductive structure and material. For example, respective film layers in the first touch electrode line 201 and the second touch electrode line 301 also has a same thickness.

The second touch electrode line according to this embodiment has same electrical and optical properties as the first touch electrode line, that is, each second touch electrode line has an optical transmittance which is not smaller than 70% and a square resistance which is not greater than 10Ω/□, which may effectively eliminate the Moire phenomenon under the premise that the second touch electrode is ensured to have a good electrical property, because the second touch electrode has a relatively high optical transmittance.

For example, one of the first touch electrode 200 and the second touch electrode 300 is a touch driving electrode, and the other is a touch sensing electrode.

It should be noted that, this embodiment is described with a case where the first touch electrode and the second touch electrode are located in different layers as an example, which is not limited thereto.

For example, it may also be a case where the touch panel includes one touch electrode layer, that is, the plurality of first touch electrodes include two types of touch electrodes, and the plurality of first touch electrodes include touch driving electrodes and touch sensing electrodes.

For example, as shown in FIG. 2A, a peripheral region surrounding a touch region where the first touch electrodes 200 and the second touch electrodes 300 are located includes a black matrix 500, that is, the black matrix 500 is provided at a periphery surrounding the touch panel. A plurality of first leading wires 202 respectively electrically connected with columns of first touch electrodes 200 extending along an X direction, and a plurality of second leading wires 302 respectively electrically connected with rows of second touch electrodes 300 extending along a Y direction are provided on the black matrix 500.

For example, the plurality of first leading wires 202 electrically connected with the plurality of first touch electrodes 200, and the plurality of second leading wires 302 electrically connected with the plurality of second touch electrodes 300 are connected to a touch detection chip (not shown) through a leading-wire end region, and the touch detection chip inputs/receives signals through the first leading wires 202 and the second leading wires 302, and analyzes signals received from respective touch electrodes, to determine the touch position.

For example, as shown in FIG. 2B, the touch panel provided by this embodiment further includes a first insulating layer 600 located between the first touch electrode 200 and the second touch electrode 300, to insulate the first touch electrode 200 from the second touch electrode 300. For example, a material of the first insulating layer 600 includes an optical transparent resin or an optical transparent adhesive, and this embodiment includes, but is not limited thereto.

In order to clearly illustrate the first touch electrodes and the second touch electrodes, the first insulating layer is not illustrated in FIG. 2A, and the first touch electrodes are indicated by broken lines, to express that the first touch electrodes are located in a layer different from the layer where the second touch electrodes are located.

For example, as shown in FIG. 2B, a second insulating layer 700 is further provided on a side of the second touch electrode 300 away from the first touch electrode 200, and the second insulating layer 700 may not only be made of the same transparent insulating material as the first insulating layer 600, but may also be made of a transparent insulating material different from the first insulating layer 600, which will not be limited in this embodiment.

For example, as shown in FIG. 2B, the touch panel further includes a shadow eliminating layer 400 on a side of the second touch electrode 300 away from the first touch electrode 200. For example, a material of the shadow eliminating layer 400 is silicon oxynitride. In this embodiment, the shadow eliminating layer provided can reduce visual contrast between a region where the first touch electrode lines (the second touch electrode lines) are provided and a region where no first touch electrode line (no second touch electrode line) is provided, so that patterns of respective touch electrode lines fade away, which, thus, improves a shadow eliminating effect of the touch panel.

Figure 2C:
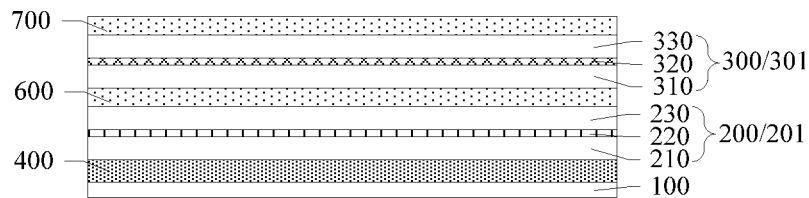
FIG. 2C is a cross-sectional view of partial layer structures taken along line AB in FIG. 2A.

For example, FIG. 2C is a cross-sectional view of partial layer structures taken along line AB in FIG. 2A in another example of this embodiment. As shown in FIG. 2C, unlike FIG. 2B, the shadow eliminating layer 400 in this example is provided between the first touch electrode 200 and the base substrate 100. For example, a material of the shadow eliminating layer 400 in the example includes columbium pentoxide. The shadow eliminating layer in the example plays a same shadow eliminating role as the previous example, so that the shadow eliminating effect of the touch panel can be effectively improved.

Figure 3:
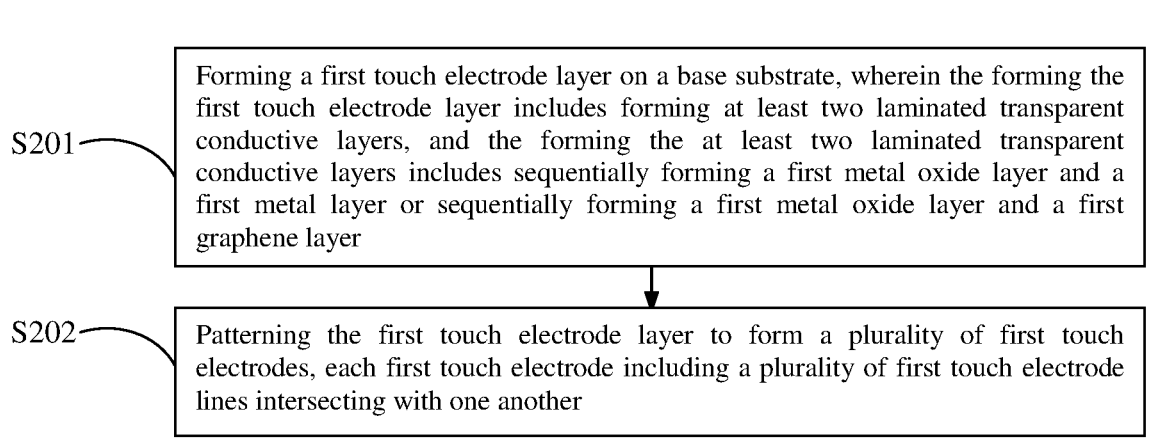
FIG. 3 is a schematic flow chart of a manufacturing method of the touch panel provided by one embodiment of the present disclosure.

An embodiment of the present disclosure provides the manufacturing method of the touch panel, and FIG. 3 is a schematic flow chart of the manufacturing method of the touch panel provided by the embodiment of the present disclosure. As shown in FIG. 3, the manufacturing method includes following steps.

S201: forming a first touch electrode layer on the base substrate, wherein, the forming the first touch electrode layer includes forming at least two laminated transparent conductive layers, and the forming the at least two laminated transparent conductive layers includes sequentially forming a first metal oxide layer and a first metal layer, or sequentially forming the first metal oxide layer and a first graphene layer.

For example, the base substrate may be made of one or more materials of glass, polyimide, polycarbonate, polyacrylate, polyetherimide, polyethersulfone, polyethylene glycol terephthalate and polyethylene naphthalate.

For example, before the first touch electrode layer is formed, the black matrix layer is formed on the base substrate, and the black matrix layer is patterned to form a black matrix pattern located in a non-touch region (the periphery surrounding the touch panel).

For example, the forming the at least two laminated transparent conductive layers includes: forming the whole-face first metal oxide layer on the base substrate, and then forming the whole-face first metal layer or the whole-face first graphene layer on the first metal oxide layer.

For example, an orthogonal projection of the first metal layer or the first graphene layer on the base substrate completely coincides with an orthogonal projection of the first metal oxide layer on the base substrate.

This embodiment is not limited thereto, for example, the forming the at least two laminated transparent conductive layers may further include: forming the whole-face first metal layer or the whole-face first graphene layer on the base substrate, and then forming the whole-face first metal oxide layer on the first metal layer or first graphene layer.

For example, a material of the first metal oxide layer may include a transparent conductive material such as indium tin oxide, and this embodiment includes, but is not limited thereto. For example, the material of the first metal oxide layer includes a combination or at least one of indium zinc oxide, zinc oxide, indium oxide, indium gallium oxide, and aluminum zinc oxide.

For example, in the direction perpendicular to the base substrate, the first metal oxide layer has a thickness ranging from 300 Å to 1200 Å.

For example, the material of the first metal layer includes the silver palladium copper alloy.

For example, in the direction perpendicular to the base substrate, the silver palladium copper alloy has a thickness ranging from 150 Å to 250 Å, in this case, the silver palladium copper alloy has an optical transmittance up to above 70% and has a square resistance lower than 10Ω/□. In addition, in this embodiment, the first metal layer is provided on a side of the first metal oxide layer away from the base substrate, which may effectively prevent the first metal layer from being broken due to excessive thinness. In the embodiment of the present disclosure, the structure of at least two laminated transparent conductive layers (i.e., the first metal oxide layer and the first graphene layer) is used for replacing the conventional metal mesh and forming the mesh touch electrode lines in a touch electrode, which not only ensures an electrical demand of the touch panel, but also effectively eliminates a Moire phenomenon.

For example, the first graphene layer has an optical transmittance above 90% and a relatively low resistivity, and therefore, like the transparent first metal layer, the first graphene layer may also achieve an effect of ensuring an electrical demand of the touch panel, and effectively eliminating the Moire phenomenon.

For example, this embodiment is described with a case where the first metal layer or the first graphene layer is located on the side of the first metal oxide layer away from the base substrate as an example, then the forming the at least two laminated transparent conductive layers further includes: forming a second metal oxide layer on a side of the first metal layer or the first graphene layer away from the first metal oxide layer. The first metal layer in one example of this embodiment is located between the two transparent metal oxide layers, which may effectively reduce a probability that the first metal layer is oxidized and corroded.

For example, the second metal oxide layer may be made of a same transparent conductive material as the first metal oxide layer, and this embodiment includes, but is not limited thereto.

For example, in the direction perpendicular to the base substrate, the second metal oxide layer has a thickness ranging from 300 Å to 1200 Å.

For example, in the direction perpendicular to the base substrate, the first touch electrode layer has a thickness ranging from 750 Å to 2650 Å, in this case, the first touch electrode layer has an optical transmittance which is not smaller than 70% and a square resistance which is not greater than 10Ω/□. For example, the first touch electrode layer has the square resistance ranging from 4Ω/□ to 7Ω/□, and this embodiment includes, but is not limited thereto. Therefore, the first touch electrode layer according to this embodiment not only has a good electrical property, but also has a relatively high optical transmittance.

For example, this embodiment is described with a case where the first touch electrode layer includes three transparent conductive layers as an example, which is not limited thereto, or the first touch electrode layer includes for example four or more transparent conductive layers.

S202: patterning the first touch electrode layer to form the plurality of first touch electrodes, each first touch electrode including the plurality of first touch electrode lines intersecting with one another.

For example, the patterning the first touch electrode layer includes patterning the at least two laminated transparent conductive layers by a single patterning process, that is, the patterning the first touch electrode layer includes: coating a photoresist layer on the first touch electrode layer, exposing and developing the photoresist layer to form a mesh-like template, and then simultaneously etching the at least two transparent conductive layers in the first touch electrode layer with nitrohydrochloric acid for 120 seconds to form the first touch electrode having the plurality of first touch electrode lines intersecting with one another. The single patterning process used in this embodiment can simplify process steps and save costs.

For example, in an example of this embodiment, the at least two transparent conductive layers may also be respectively etched with the nitrohydrochloric acid and oxalic acid. For example, the first metal oxide layer and the second metal oxide layer may be etched with the nitrohydrochloric acid, and the first metal layer may be etched with the oxalic acid.

For example, the first transparent insulating layer is formed on the first touch electrode to insulate the first touch electrode from a subsequently formed second touch electrode layer.

For example, the first insulating layer is made of a material including an optical transparent resin or an optical transparent adhesive, and this embodiment includes, but is not limited thereto. For example, a layer of optical transparent resin or a layer of optical transparent adhesive is coated on the first touch electrode and cured at 230° C.

For example, the second touch electrode layer is formed on a side of the first touch electrode away from the base substrate, the forming the second touch electrode layer includes forming at least two laminated transparent conductive layers, and the forming the at least two laminated transparent conductive layers includes sequentially forming a third metal oxide layer and a second metal layer, or sequentially forming a third metal oxide layer and a second graphene layer.

The step of forming the first touch electrode layer may be referred to for forming the second touch electrode layer according to this embodiment, which will not be repeated here.

For example, the second touch electrode layer is patterned to form the plurality of second touch electrodes, and each second touch electrode includes the plurality of second touch electrode lines intersecting with one another.

For example, the patterning the second touch electrode layer includes: patterning the at least two laminated transparent conductive layers by a single patterning process, so as to save process steps, and this embodiment includes, but is not limited thereto.

For example, the whole-face second transparent insulating layer is formed on the second touch electrode to protect the second touch electrode lines intersecting with one another.

For example, the second transparent insulating layer may be formed with a same material by using same process steps as the first transparent insulating layer, and this embodiment includes, but is not limited thereto.

For example, a shadow eliminating layer is formed on the side of the second touch electrode away from the first touch electrode, that is, the shadow eliminating layer may be formed on the second transparent insulating layer, so as to improve a shadow eliminating effect of the touch panel.

For example, the shadow eliminating layer may be made of silicon oxynitride.

For example, screen etching is performed on the shadow eliminating layer located in a bonding region to remove the shadow eliminating layer material located in the bonding region.

For example, in another example of this embodiment, the shadow eliminating layer is formed on the base substrate before the first touch electrode layer is formed, and then the whole-face first touch electrode layer is formed on the shadow eliminating layer; and in the example, the shadow eliminating layer can effectively improve the shadow eliminating effect of the touch panel.

For example, the shadow eliminating layer in the example is made of a material including columbium pentoxide.

Another embodiment of the present disclosure provides the touch display device, and the touch electrode lines included in the touch electrodes in the touch display device not only has a good electrical property, but also has an optical transmittance which is not smaller than 70%, so it may effectively eliminate a Moire phenomenon.

For example, the touch display device provided by an example of this embodiment further includes the shadow eliminating layer, so the touch display panel further has a good shadow eliminating effect.

For example, the touch display device may be a display device such as a liquid crystal display device and an organic light-emitting diode (OLED) display device, or may be any other product or component having a display function including the display device such as a television, a digital camera, a mobile phone, a watch, a tablet computer, a laptop, and a navigator, and this embodiment is not limited thereto.

There are some points to be illustrated:

(1) Unless otherwise defined, in the embodiments of the present disclosure and the accompanying drawings, a same reference sign denotes a same meaning;

(2) Drawings of the embodiments of the present disclosure only refer to structures related with the embodiments of the present disclosure, and other structures may refer to general design;

(3) In order to make it clear, in the drawings for illustrating the embodiments of the present disclosure, layers or regions are magnified. It should be understood that, when elements such as a layer, a film, a region or a substrate and the like are called to be "on" or "below" another element, the elements may be directly located "on" or "below" the another element, or there may be an intermediate element.

The above merely is specific embodiments of the present disclosure, and not intended to define the scope of the present disclosure. Any variations or replacements which can be easily thought of by those skilled in the art in the scope of the present disclosure all shall fall within the scope of protection of the present disclosure. Therefore, the scope of the present disclosure should be the scope of the following claims.

What is claimed is:

1. A touch panel, comprising:
   a base substrate; and
   a first touch electrode on the base substrate, wherein the first touch electrode comprises a plurality of first touch electrode lines intersecting with one another,
   wherein in a direction perpendicular to the base substrate, each of the plurality of first touch electrode lines comprises at least two laminated transparent conductive layers, and the at least two laminated transparent conductive layers comprise a laminate of a first metal oxide layer and a first graphene layer,
   wherein an orthographic projection of the first metal oxide layer on the base substrate coincides with an orthographic projection of the first graphene layer on the base substrate.

2. The touch panel according to claim 1, wherein each of the plurality of first touch electrode lines further comprises a second metal oxide layer on a side of the first graphene layer away from the first metal oxide layer.

3. The touch panel according to claim 2, wherein a material of at least one of the first metal oxide layer and the second metal oxide layer comprises indium tin oxide.

4. The touch panel according to claim 1, wherein, in the direction perpendicular to the base substrate, each of the plurality of first touch electrode lines has a thickness ranging from 750 Å to 2650 Å.

5. The touch panel according to claim 1, wherein each of the plurality of first touch electrode lines has a square resistance which is not greater than $10\Omega/\square$.

6. The touch panel according to claim 1, further comprising:
   a second touch electrode on a side of the first touch electrode away from the base substrate, wherein the second touch electrode comprises a plurality of second touch electrode lines intersecting with one another, and the first touch electrode is insulated from the second touch electrode,
   wherein each of the plurality of second touch electrode lines comprises at least two another laminated transparent conductive layers, and the at least two another laminated transparent conductive layers comprise a laminate of a third metal oxide layer and a second metal layer, or a laminate of the third metal oxide layer and a second graphene layer.

7. The touch panel according to claim 6, wherein one of the first touch electrode and the second touch electrode is a touch driving electrode, and the other of the first touch electrode and the second touch electrode is a touch sensing electrode.

8. A touch display device, comprising the touch panel according to claim 1.

9. The touch panel according to claim 1, where the touch panel comprises a plurality of first touch electrodes, and the plurality of first touch electrodes include touch driving electrodes and touch sensing electrodes.

10. The touch panel according to claim 1, further comprising:
    a shadow eliminating layer on a side of the first touch electrode away from the base substrate,
    wherein the shadow eliminating layer is an outmost layer of the touch panel, the shadow eliminating layer is configured to reduce a visual contrast between a region where the first touch electrode lines are provided and a region where no first touch electrode line is provided, so that patterns of respective touch electrode lines fade away.

11. The touch panel according to claim 10, wherein a material of the shadow eliminating layer is silicon oxynitride.

12. A manufacturing method of a touch panel, comprising:
    forming a first touch electrode layer on a base substrate, wherein the forming the first touch electrode layer comprises forming at least two laminated transparent conductive layers, and the forming the at least two laminated transparent conductive layers comprises sequentially forming a first metal oxide layer and a first graphene layer; and
    patterning the first touch electrode layer to form a first touch electrode, wherein the first touch electrode comprises a plurality of first touch electrode lines intersecting with one another,
    wherein an orthographic projection of the first metal oxide layer on the base substrate coincides with an orthographic projection of the first graphene layer on the base substrate.

13. The manufacturing method of the touch panel according to claim 12, wherein the forming the at least two laminated transparent conductive layers further comprises:
    forming a second metal oxide layer on a side of the first graphene layer away from the first metal oxide layer.

14. The manufacturing method of the touch panel according to claim 12, wherein the patterning the first touch electrode layer comprises:
    patterning the at least two laminated transparent conductive layers by using a single patterning process.

15. The manufacturing method of the touch panel according to claim 12, further comprising:
    forming a second touch electrode layer on a side of the first touch electrode away from the base substrate, wherein the forming the second touch electrode layer comprises forming at least two another laminated transparent conductive layers, the forming the at least two another laminated transparent conductive layers comprises sequentially forming a third metal oxide layer and a second metal layer, or sequentially forming the third metal oxide layer and a second graphene layer, and the second touch electrode layer is insulated from the first touch electrode; and
    patterning the second touch electrode layer to form a second touch electrode, wherein the second touch electrode comprises a plurality of second touch electrode lines intersecting with one another.

* * * * *